United States Patent [19]

Hall

[11] Patent Number: 5,245,629
[45] Date of Patent: Sep. 14, 1993

[54] METHOD FOR COMPENSATING FOR CAPACITY OVERLOAD IN A SPREAD SPECTRUM COMMUNICATION SYSTEM

[75] Inventor: Scott M. Hall, Fort Worth, Tex.

[73] Assignee: Motorola, Inc., Schaumburg, Ill.

[21] Appl. No.: 783,751

[22] Filed: Oct. 28, 1991

[51] Int. Cl.$^5$ ............................................... H04K 1/00
[52] U.S. Cl. ............................................................ 375/1
[58] Field of Search ............................... 375/1; 380/34

[56] References Cited

U.S. PATENT DOCUMENTS

| | | | |
|---|---|---|---|
| 4,222,115 | 9/1980 | Cooper et al. | 375/1 |
| 4,901,307 | 2/1990 | Gilhousen et al. | 375/1 |
| 5,056,109 | 10/1991 | Gilhousen et al. | 375/1 |
| 5,093,840 | 3/1992 | Schilling | 375/1 |
| 5,101,501 | 3/1992 | Gilhousen et al. | 375/1 |
| 5,109,390 | 4/1992 | Gilhousen et al. | 375/1 |
| 5,157,686 | 10/1992 | Omura et al. | 375/1 |
| 5,166,952 | 11/1992 | Omura et al. | 375/1 |

*Primary Examiner*—Salvatore Cangialosi
*Attorney, Agent, or Firm*—Raymond J. Warren

[57] ABSTRACT

A method for compensating for capacity overload in a communication system by first determining the received signal power level at a base site is described. The power level is compared with a threshold power level. If the received power level is greater than the threshold, the signal-to-noise ratio for the system is reduced. With the acceptable signal-to-noise ratio reduced, the subscriber power will be reduced. The received signal power level at the base site will then return to the threshold level. Alternatively, a signal-to-noise ratio of a pilot signal can be determined at the base. The signal-to-noise ratio is compared to a threshold signal-to-noise ratio. If the signal-to-noise ratio of the pilot is less than the threshold, the threshold level is reduced. With the acceptable signal-to-noise ratio reduced, the subscribers are directed to reduce their power.

17 Claims, 6 Drawing Sheets

METHOD FOR COMPENSATING FOR CAPACITY OVERLOAD IN A SPREAD SPECTRUM COMMUNICATION SYSTEM

FIELD OF THE INVENTION

The present invention relates, in general, to communication systems and, more particularly, to spread spectrum communication systems.

BACKGROUND OF THE INVENTION

In a cellular communication system using spread spectrum technology, such as Code Division Multiple Access (CDMA), the spectrum is divided into 40 frequency bands. The 40 bands are divided between wireline and non-wireline applications, generally assigning 20 bands to each. The 20 bands are equally divided with 10 bands used for forward communication with the base station as the transmitter and 10 bands used for reverse communication with the mobile as the transmitter. Each band is typically 1.2288 MHz wide and will handle multiple users simultaneously.

In this description, calls and users are used interchangeably. A band that supports X users supports X calls. The capacity of a band in number of users always refers to full rate (9600 baud) users unless otherwise stated. A band that supports X full rate (9600 baud) users, will support 2X half rate (4800 baud) users, or 4X quarter rate (2400 baud) users. The band will also support a certain number of variable rate users (9600, 4800, 2400, or 1200) with the exact number of users dependent on the amount of time spent at each baud rate.

In operating at system capacity, accurate mobile transmit power control is very important. Mobile power is controlled from the base station by transmitting power control data to every transmitting mobile. The base station can direct each mobile to increase or decrease its transmitting power, typically in preset increments (e.g. 0.5 dB).

Channel interference is an on going problem in any communication system. The interference is generally caused by a combination of thermal noise (KTB), man made noise, and co-channel noise. Co-channel noise results from other calls on the same channel, either within the same cell or from another cell. As the interference within a cell increases, the base site will direct the subscriber units to increase power. This increased power will cause interference in other cell sites which will then raise their power to compensate. This will escalate until the maximum power output of one or more subscribers is reached. At this point, the signal-to-noise ratio will drop below a preselected minimum level and one or more calls will be dropped.

Therefore, it is an on-going effort for cellular designers in a CDMA system to maximize the number of users on a system while at the same time avoiding the noise problems caused by those users.

SUMMARY OF THE INVENTION

The present invention provides a method for compensating for capacity overload in a spread spectrum communication system by first determining the received signal power level at a base site. This power level is compared with a threshold power level. If the received power level is greater than the threshold level, the reverse (subscriber to base) signal-to-noise ratio for the system is adjusted (reduced). With the acceptable signal-to-noise ratio reduced, the subscribers are directed, through a power control signal from the base site, to reduce their transmitted power. The subscribers then adjust (reduce) their transmitted power bringing the received signal power level at the base site back to the threshold level.

Alternatively, a signal-to-noise ratio of a reverse pilot signal can be determined at the base site. The signal-to-noise ratio is then compared to a threshold signal-to-noise ratio. If the signal-to-noise ratio of the pilot is less than the threshold, then the threshold level is adjusted (reduced). With the acceptable signal-to-noise ratio reduced, the subscribers are directed, through a power control signal from the base site, to reduce their power. The subscribers then adjust (reduce) their power bringing the received signal power level at the base site back to the threshold level.

These methods permit the system to accommodate more users without resulting in an escalation of the power level of the cell triggered by the additional noise generated.

DETAILED DESCRIPTION OF THE DRAWINGS

Figure 1A:
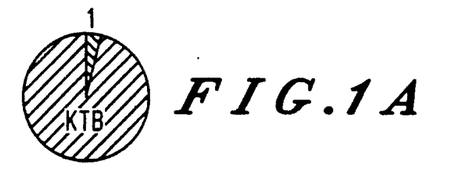
FIGS. 1A–1C are abstract representations of power use by user within a communication system.
Figure 1B:
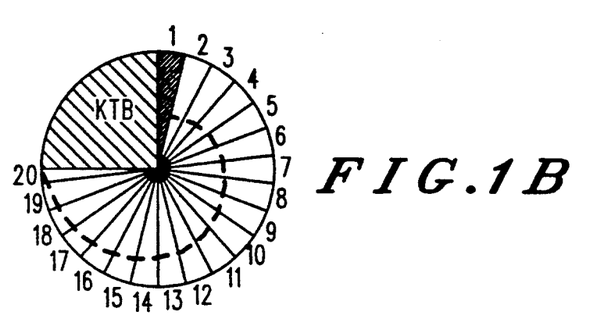
Figure 1C:
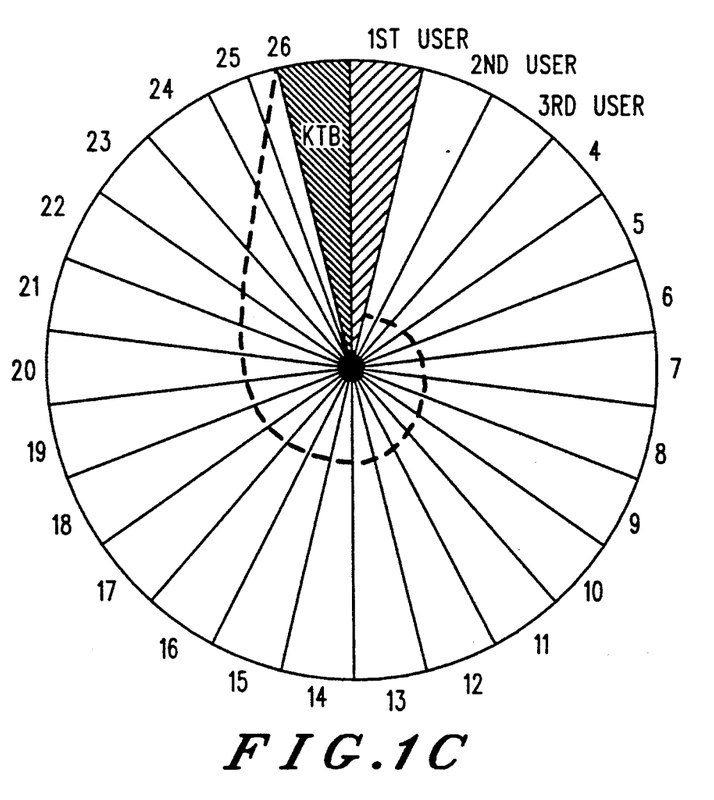

Referring initially to FIGS. 1A–1C, abstract representations of power usage by user within a communication system is illustrated. Within these figures, the areas represent the power of various signals over the 1.2288 MHz bandwidth. For example, KTB is the power of the thermal noise signal where: K is Boltzmans constant; T is the temperature in degrees absolute (Kelvin); and B is the signal bandwidth in hertz (Hz). The power of the KTB signal is constant in each of FIGS. 1A–1C. For purposes of this discussion, we will use a KTB of $-113$ dBm.

When a single user is on the system, FIG. 1A, the power of the user's signal must be $-127$ dBm (14 dBm below KTB) in order to provide an Energy per bit to total Noise ratio ($E_b/N_o$) of 7 dB. The 7 dB number was selected as a ratio which will provide a preferred audio signal quality. This figure will vary for each system depending upon the particular environment of the system and is used herein only for illustrative purposes.

Figure 2:
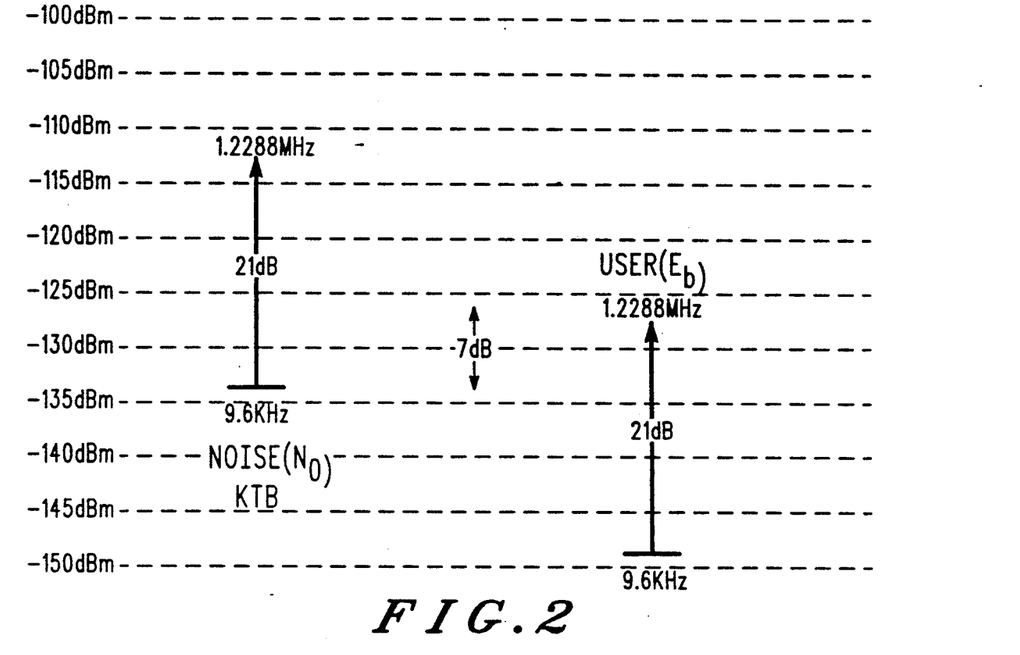
FIG. 2 is a graph illustrating the power level of the signals of FIG. 1A.

The calculation of the $-127$ dBm figure for the single user signal of FIG. 1 is demonstrated with use of the graph of FIG. 2. Here, noise ($N_o$) for the 1.2288 MHz Bandwidth is shown as $-113$ dBm. When the noise signal is processed from a 1.2288 MHz bandwidth signal to a 9.6 KHz bandwidth, a 21 dB reduction is achieved as shown in equation 1.

$$10 \log_{10}(9.6/1.2288) = -21 \, dB \quad (1)$$

This places the noise signal at −134 dBm at a 9.6 bandwidth. Therefore, to achieve an $E_b/N_o$ of 7 dB, a −127 dBm (−134+7) signal ($E_b$) must be provided at the 1.2288 MHz bandwidth. To achieve the −127 dBm after processing, a −148 dBm signal (−127−21) is needed before adding 21 dB of processing gain. This works out to the receive power KTB.

The purpose of the 7 dB $E_b/N_o$ level is to provide a desired audio quality in the signal. If the $E_b/N_o$ of a particular signal should drop below 7 dB, the cell site would look to hand-off the call. Failing a hand-off, the system may terminate the call.

In FIG. 1B, a representation of a system having an additional 19 users is illustrated. With respect to user 1, the 19 new users provide additional noise. While KTB is a smaller proportion of the circle, as compared with FIG. 1A, the overall area of KTB is the same. However, because of the added noise from the additional users, the area (power) of user 1 has increased. The dashed spiral line in FIG. 1B starts at the user power level for a single user system and moves outward as additional users are added; until reaching the current radius of the circle with 20 users.

In FIG. 1C, the system has reached 25.5 users, the point where KTB has the same power as one user. Adding 24.5 users to KTB for an equivalence of 25.5 users; each of which are contributing noise to the call of the remaining users. Again, the area of KTB has remained the same throughout the addition of users, while the power of user 1 has increased to compensate for the additional noise.

Figure 3:
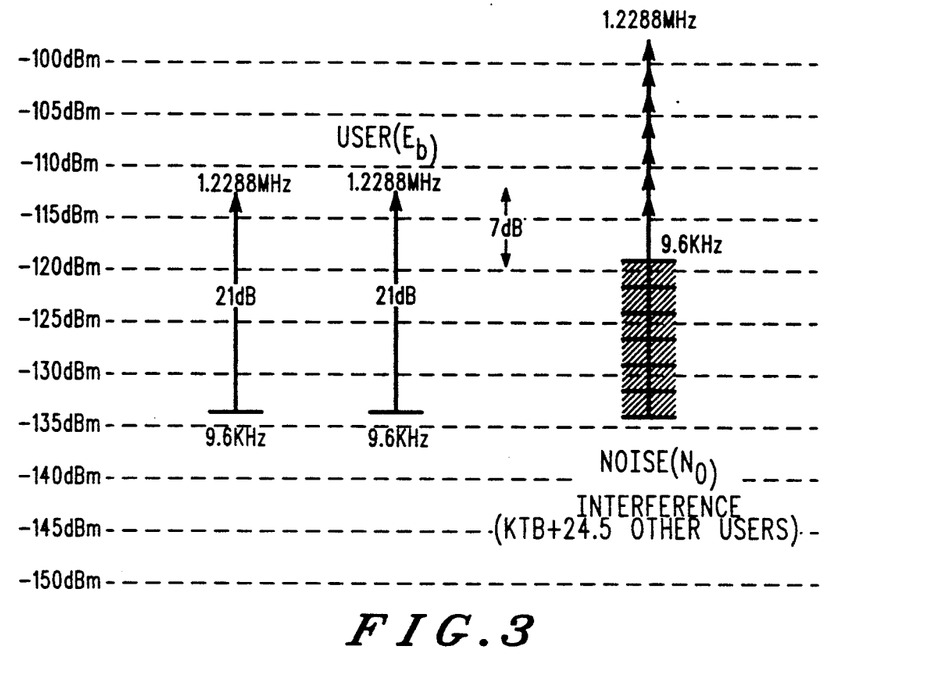
FIG. 3 is a graph illustrating the power level of the signals of FIG. 1C.

In FIG. 3, a graph of the KTB, Noise, and User 1 power levels is shown. As illustrated, the power level of KTB has not changed. However, the total interference ($N_o$), including KTB, has increased from −113 dBm to −99 dBm at 1.2288 MHz. Reducing the power level by 21 dB (see equation (1) above), the power level is −120 dBm. To provide an $E_b/N_o$ of 7 dB, the user signal must be −113 dBm (−120+7) at 1.2288 MHz. Therefore, as the number of additional users increase, the signal level of the target user must increase from a level 14 dBm below KTB, to a level equal to KTB.

In the present communication systems, the maximum number of users, here 26.5 (which would be rounded to 26 full rate users), are predetermined based upon a set $E_b/N_o$, here 7 dB. This means that a 27th user would be prevented from obtaining access to the system. If the 27th user was not prevented from entering the system, the power needed by each subscriber to overcome the interference would escalate to infinity. This is demonstrated in the graph of FIG. 4. In this graph, the abscissa is the number of users in the system and the ordinate is $E_b/KTB$. At a constant $E_b/N_o$ of 7 dB, the $E_b/KTB$ increases from around 33 dB for 26 users to infinity for 27 users. As shown by the column labeled "KTB Equivalence in Number of Users", the constant KTB power is fit into the equivalent of 0.1 users at 26 users. In relation to FIGS. 2 and 3, as the number of users increases, the constant KTB is forced into narrower slices of the pie tending toward zero. This in turn, since the KTB power is constant, increases the radius of the pie toward infinity.

As the subscribers hit their maximum power levels, shown as 6.3 watts for mobiles and 300 milliwatts for portables, the effective range of the cell shrinks, tending toward zero. This results in calls being dropped until the system can again be brought under control. The system would be brought under control by dropping the calls having an $E_b/N_o$ below 7 dB.

This problem is compounded by the fact that the internal interference of one cell is the external interference of another cell. The graph of FIG. 5, a system is shown having a primary user; 16 additional users; KTB; and 8.5 users worth of interference from outside the cell. If the interference were to increase, the power output of the 17 users would have to increase to keep the interference segment from forcing out one of the users. As the interference increases toward infinity, as in the example above, the power output by the resident users of this cell would also increase toward infinity. This demonstrates that one cell going out of control can have a ripple effect throughout the system.

Figure 4:
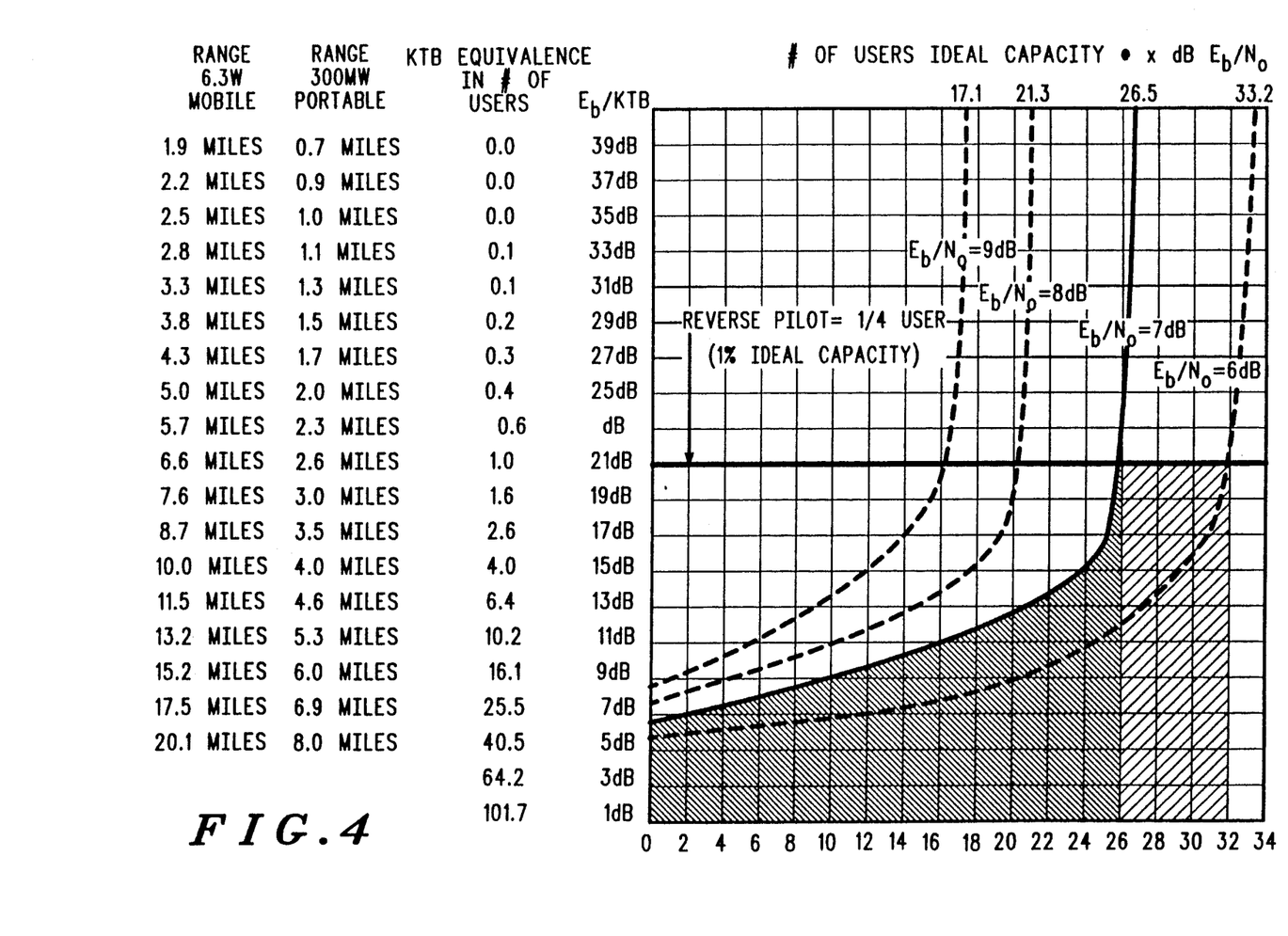
FIG. 4 is a chart of the signal-to-thermal noise ratio vs. the number of users for set signal-to-noise ratios.
Figure 5:
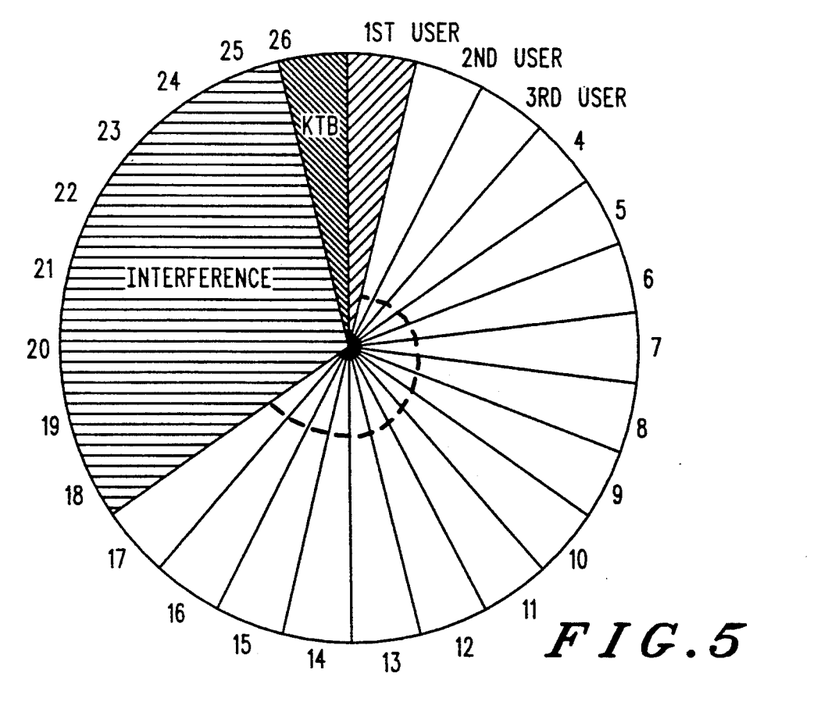
FIG. 5 is a graph illustrating the power level of another communication system.

In addition, FIG. 5 illustrates that having a preset maximum number users for a system does not alleviate the power control problem. In FIG. 5, while only 17 resident users are on the system, it is at capacity because the interference occupies the additional 8.5 user slots. If an 18th user enters the system, which would be permitted since the number of resident users is not at its maximum, the power levels will escalate out of control as described above with FIG. 4. One possible solution would be to set the maximum number of users to 17, or some number less than full capacity. Since the interference will vary anywhere from 0 users to more than 8.5 users, the maximum capacity would have to be chosen based upon the worst case of interference anticipated. This would waste system capacity by restricting new users even when the interference is less than the worst case design.

A solution to this problem is to permit the $E_b/N_o$ level to float depending upon the circumstances. Returning to FIG. 4 and the above example, the addition of the 27th user when $E_b/N_o$ is set at 7 dB caused the present invention, the system is permitted to reduce the $E_b/N_o$ level. If the $E_b/N_o$ is reduced from 7 dB to 6 dB, the $E_b/KTB$ value drops from infinity to around 14 dB. This will also cause all of the subscribers in the system to reduce their power to match a 6 dB $E_b/N_o$ level. It should be noted here that the $E_b/N_o$ reduction does not need to be a full decibel but could be a fraction of a decibel. In addition, the system need not attempt to totally compensate for the additional user all in one step. The $E_b/N_o$ may be reduced in incremental steps until a level is reached where all of the calls may be accommodated.

A drawback to this process is that when the $E_b/N_o$ level is reduced, the quality of all of the calls in the system is reduced slightly. In order to keep the quality of the calls from being degraded too much, a minimum $E_b/N_o$ threshold level is established. Once the minimum $E_b/N_o$ is reached, subscribers that are unable to operate at that minimum level would be handed-off, if possible.

As calls are completed and the number of users begins to drop, the $E_b/N_o$ would increase incrementally to the original threshold value.

While this method permits the addition of users, the power control problems still remain. Once the $E_b/N_o$ hits its minimum, the next user could push the system over the edge. One solution to this problem is to preset the maximum number of users permitted on the system. However, as set forth above in the description of FIG.

5, this does not always resolve the problem. Therefore, the present invention adds a reverse pilot signal at the base station to serve as a power limit. This signal would occupy a special channel at the base station; is maintained at a constant power level; and is not controlled by the base station.

The pilot signal would be used to determine when the $E_b/N_o$ threshold level needed adjustment. To determine when adjustment is needed, either feedback or hysteresis can be used. One particular method, generally designated 60, of implementing this invention is demonstrated in FIG. 6. This embodiment utilizes the hysteresis approach. It commences at block 61 and continues to block 62 where the $E_b/N_o$ of the pilot is determined.

Figure 6:
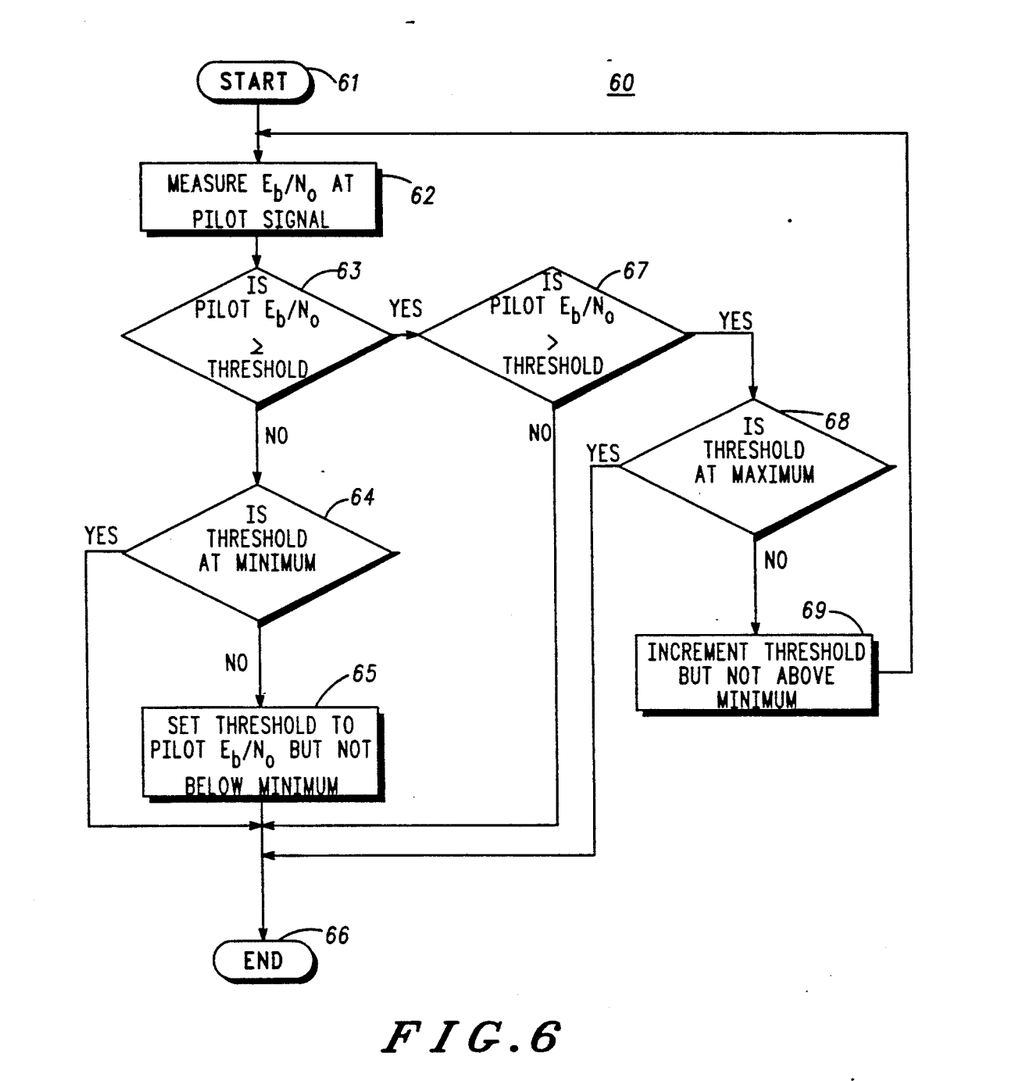
FIG. 6 is a block diagram of a process representing the present invention.

Process 60 then determines if the $E_b/N_o$ of the pilot is greater than or equal to the threshold $E_b/N_o$ of the system, decisions step 63. If the pilot $E_b/N_o$ is not greater than or equal the threshold, process 60 determines if the threshold is already at system minimum, decision step 64. If the threshold is at minimum, process 60 ends, step 66. If the threshold is not at minimum, the threshold $E_b/N_o$ is set equal to the pilot $E_b/N_o$, but not below minimum threshold, step 65. Process 60 then ends, step 66.

If the pilot $E_b/N_o$ was greater than or equal to threshold, step 63, process 60 proceeds to decision step 67 where it is determined if the pilot $E_b/N_o$ is greater than the threshold. If the pilot $E_b/N_o$ is not greater than the threshold (e.g. the pilot $E_b/N_o$ is equal to the threshold), then process 60 ends, step 66.

If the pilot $E_b/N_o$ is greater than threshold, decision step 68, then process 60 determines if the threshold $E_b/N_o$ is at maximum, decision step 68. If the threshold is at maximum, process 60 ends, step 66. If the threshold is not at maximum, the threshold value is incremented, but not to exceed maximum threshold, step 69. Process 60 then loops back to step 62.

Timing of the $E_b/N_o$ changes may also be implemented to prevent the $E_b/N_o$ level from changing prematurely do to some temporary anomaly. In the above embodiment, if the pilot is less than or equal to the threshold level, the threshold will be set equal to the pilot without delay. This is necessary to keep the system for escalating power out of control. If the pilot is greater than the threshold level for 200 msec, then the threshold is increased by 0.2 dB every 200 msec with an upper limit of the maximum threshold level.

Referring again to the graph of FIG. 4, the slope of the $E_b/N_o$ curves approach infinity as the number of system users approaches a maximum. This sharp slope of the curve near ideal capacity causes power control instabilities. The reverse pilot provides an absolute limit to the users power to prevent power control run away. The reverse pilot allows accurate $E_b/N_o$ control for heavily loaded cells. The reverse pilot is a constant power spread spectrum transmitter that the cell site can receive and compare power control versus the other users. Since the pilot is at constant power, when the site is at low capacity, the base station will see reverse pilot $E_b/N_o$ higher than the threshold. At high capacity, the base station will see the reverse pilot $E_b/N_o$ lower than the threshold and will readjust the power of the subscribers to match the $E_b/N_o$ of the reverse pilot.

The location of the reverse pilot may be placed at the cell boundary with its constant power set for a 300 milliwatt $-4$ dB margin, to represent the range of a portable. However, a preferable location for the reverse pilot is at the base station receiver. This will prevent it from interfering with adjacent cells. While the power of the pilot signal is fixed, it may be adjusted to increase or decrease the cell range. This adjustment may be based upon: time of day factors; change of demographics within the cell; or various other factors.

As will be understood, the pilot signal will utilize some of the capacity of the system. The pilot power may represent a full user or as little as $\frac{1}{8}$ user. At $\frac{1}{8}$ user, the pilot would occupy very little of the capacity of the system and in many instances have no practical effect. For example, in FIG. 4, the ideal number of full rate users for $E_b/N_o$s of 6, 7, and 8 dB is 33.2, 26.5, and 21.3 respectively. A deduction of 0.125 users ($\frac{1}{8}$) would reduce the capacity by much less than 1%.

Figure 7A:
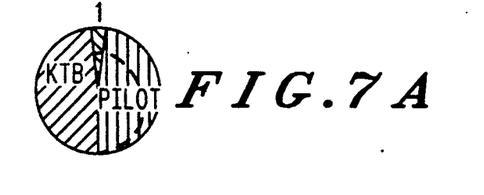
FIGS. 7A–7C are abstract representations of the power use by user of FIGS. 1A–1C, respectively, incorporating a reverse pilot signal.
Figure 7B:
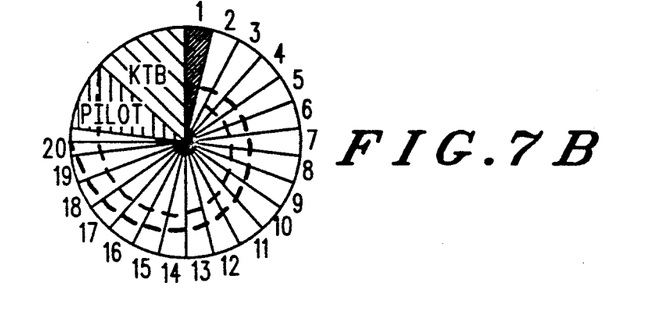
Figure 7C:
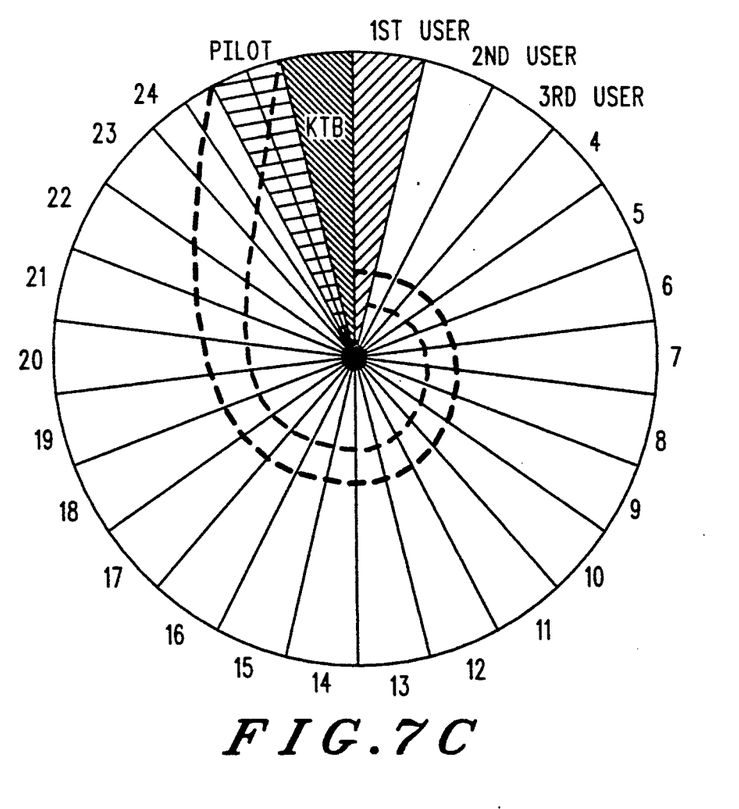
Figure 8:
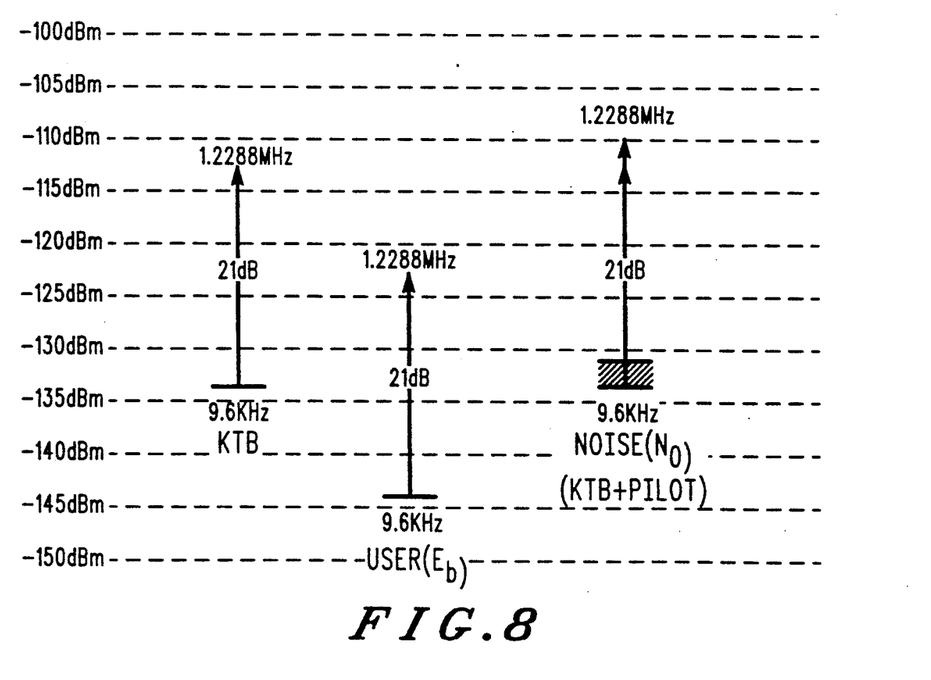
FIG. 8 is a graph illustrating the signal power level of the signals for FIG. 7A.

Referring to FIGS. 7A-7C, abstract representations of power usage by user are presented incorporating the pilot signal. Starting with FIGS. 7A and 7B, it is shown that at less than capacity, the pilot and KTB take the same amount of power. Specifically, with regard to FIG. 7A, placing the pilot and KTB signals at $-113$ dBm (1.2288 MHz) will require that the user signal be at $-124$ dBm (9.6 KHz) to maintain an $E_b/N_o$ of 7 dB. This is illustrated in FIG. 8 where the total noise is at $-110$ dBm (1.2288 MHz) which when converted is $-131$ dBm ($-110-21$). In order to provide an $E_b/N_o$ of 7 dB a $-124$ dBm (at 1.2288 MHz) of signal is required. The same calculations for 20 users, FIG. 7B, finds that each user must transmit at a power level of $-118$ dBm. These figures are 3 dBm higher than their counter parts without the pilot signal.

In FIG. 7C, the system has reached 24.5 users, the point where KTB and the pilot each have the same power as one user. This results in 25.5 user equivalents (23.5 users plus KTB and the pilot) contributing noise to the call of a single user. Again, the area of KTB and the pilot have remained the same throughout the addition of users, while the power of user 1 has increased to compensate for the additional user noise. In this example, the use of a full rate pilot has reduced the capacity of the cell by one as compared to FIG. 1C. With the use of a $\frac{1}{8}$ rate pilot, most of the lost capacity could be recovered.

The results of using a pilot are also demonstrated in FIG. 4. Assuming a maximum threshold $E_b/N_o$ of 7 dB and a minimum threshold $E_b/N_o$ of 6 dB the user signal power as a function of noise will grow along the 7 dB $E_b/N_o$ line until the reverse pilot signal, set here at 21 dB, is reached. At this point, there are approximately 25 users on the system. In addition, the $E_b/N_o$ of the users is equal to the $E_b/N_o$ of the pilot. When the next user is added, the user signal power would be increased by the system to maintain $E_b/N_o$ at 7 dB. than the user (less than 7 dB). The present invention would decrease the threshold level to equal the new $E_b/N_o$ of the pilot signal. This places a limit on the users power use and guards against a run away condition.

As the system continues to add users, the $E_b/N_o$ of the system will continue to be reduced until a minimum threshold level is reached. For example, if the minimum threshold were set to 6 dBm, only 32 users would be permitted on the system. Any additional users would either be prevented from entering the system, or be handed off to another cell. Alternatively, the system could be constructed to look to hand-off and existing user to make room for a new user.

When calls are terminated and the number of users is reduced, the power of the users would be handled in the reverse of the procedure just discussed.

Therefore, a means has been shown which helps eliminate power control run away in a communication system.

Thus, it will be apparent to one skilled in the art that there has been provided in accordance with the invention, a method for compensating for capacity overload in a spread spectrum communication system that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method of compensating for capacity overload in a spread spectrum communication system comprising the steps of:
   determining a receiver site power level at a first base site of said spread spectrum communication system;
   comparing said receiver site power level to a threshold power level;
   adjusting a signal-to-noise ratio for said spread spectrum communication system at said first base site if said receiver site power level is greater than said threshold power level;
   transmitting a power control signal from said first base site to a subscriber of said spread spectrum communication system; and
   adjusting a transmit power of said subscriber in response to said power control signal.

2. The method of claim 1 whereby adjusting said transmit power of said subscriber reduces said receiver site power level to a reduced receiver site power level.

3. The method of claim 2 wherein said spread spectrum communication system has a maximum threshold power level and a minimum threshold power level.

4. The method of claim 3 wherein said receiver site power level is compared to said maximum threshold power level.

5. The method of claim 4 wherein said reduced receiver site power level is said minimum threshold power level.

6. The method of claim 5 wherein a request to add a new user to said spread spectrum communication system is refused.

7. The method of claim 5 wherein a request to add a new user to said first base site of said spread spectrum communication system is handed off to a second base site of said spread spectrum communication system.

8. The method of claim 5 wherein a current user of said first base site is handed off to a second base site of said spread spectrum communication system.

9. A method of compensating for capacity overload in a spread spectrum communication system comprising the steps of:
   determining a signal-to-noise ratio of a pilot signal of a pilot of said spread spectrum communication system;
   comparing said signal-to-noise ratio to a threshold signal-to-noise ratio;
   adjusting said threshold signal-to-noise ratio for said spread spectrum communication system at a first base site if said signal-to-noise ratio is less than said threshold signal-to-noise ratio;
   transmitting a power control signal from said first base site to a subscriber of said spread spectrum communication system; and
   adjusting a transmit power of said subscriber in response to said power control signal.

10. The method of claim 9 wherein said spread spectrum communication system has a maximum threshold signal-to-noise ratio and a minimum threshold signal-to-noise ratio.

11. The method of claim 10 wherein said pilot signal-to-noise ratio is compared to said maximum threshold signal-to-noise ratio.

12. The method of claim 11 wherein said pilot signal-to-noise ratio is said minimum threshold signal-to-noise ratio.

13. The method of claim 12 wherein a request to add a new user to said spread spectrum communication system is refused.

14. The method of claim 12 wherein a request to add a new user to said first base site of said spread spectrum communication system is handed off to a second base site of said spread spectrum communication system.

15. The method of claim 12 wherein a current user of said first base site is handed off to a second base site of said spread spectrum communication system.

16. A spread spectrum communication system comprising:
   determining means for determining a receiver site power level at a base site of said spread spectrum communication system;
   comparing means coupled to said determining means for comparing said receiver site power level to a threshold power level;
   adjusting means coupled to said comparing means for adjusting a signal-to-noise ratio for said spread spectrum communication system at said base site if said receiver site power level is greater than said threshold power level;
   transmitting means coupled to said adjusting means for transmitting a power control signal from said base site to a subscriber of said spread spectrum communication system; and
   adjusting means at said subscriber for adjusting a transmit power of said subscriber in response to said power control signal.

17. A spread spectrum communication system comprising:
   determining means for determining a signal-to-noise ratio of a pilot signal of a pilot of said spread spectrum communication system;
   comparing means coupled to said determining means to compare said signal-to-noise ratio to a threshold signal-to-noise ratio;
   adjusting means coupled to said comparing means for adjusting said threshold signal-to-noise ratio for said spread spectrum communication system at said base site if said signal-to-noise ratio is less than said threshold signal-to-noise ratio;
   transmitting means coupled to said adjusting means for transmitting a power control signal from said base site to a subscriber of said spread spectrum communication system; and
   adjusting means at said subscriber for adjusting a transmit power of said subscriber in response to said power control signal.

* * * * *